United States Patent [19]
King et al.

[11] Patent Number: 5,542,450
[45] Date of Patent: Aug. 6, 1996

[54] APPARATUS FOR METERING FLUIDS

[75] Inventors: Stanley C. King, Cumming; Richard C. Knop, Marietta; John E. Green, Whitesburg, Ga.; Thomas R. Gyde, Dawsonville; L. William Silzle Jr., Marietta, all of Ga.

[73] Assignee: The Lubrizol Corporation, Wickliffe, Ohio

[21] Appl. No.: 257,992

[22] Filed: Jun. 10, 1994

[51] Int. Cl.$^6$ ............................................. F16K 49/00
[52] U.S. Cl. .................... 137/614.2; 137/551; 137/545; 137/334; 251/366
[58] Field of Search .................... 137/551, 559, 137/613, 614.2, 545, 549, 334; 251/366

[56] References Cited

U.S. PATENT DOCUMENTS

| 319,052 | 6/1985 | Bailey et al. | 137/549 |
|---|---|---|---|
| 4,029,121 | 6/1977 | Buzzi | 137/545 |
| 4,062,220 | 12/1977 | Taube et al. | 73/3 |
| 4,062,472 | 12/1977 | Taube | 222/1 |
| 4,880,536 | 11/1989 | Haraveth et al. | 210/232 |
| 5,014,211 | 5/1991 | Turner et al. | 364/478 |
| 5,029,100 | 7/1991 | Young et al. | 364/479 |
| 5,118,008 | 6/1992 | Williams | 222/1 |
| 5,209,258 | 5/1993 | Sharp et al. | 137/343 |
| 5,246,026 | 9/1993 | Proudman | 137/3 |
| 5,271,526 | 12/1993 | Williams | 222/16 |
| 5,287,878 | 2/1994 | Oike | 137/549 |

FOREIGN PATENT DOCUMENTS 2086535  5/1982  United Kingdom ............ F16K 27/00

*Primary Examiner*—A. Michael Chambers
*Attorney, Agent, or Firm*—John H. Engelmann; Frederick D. Hunter, Sr.; David M. Shold

[57] ABSTRACT

An apparatus for metering fluids is disclosed which comprises: a solid block having within the block a first fluid inlet; a filter assembly; a first fluid outlet; a first channel connecting the first fluid inlet to the filter assembly, and further connecting the filter assembly to the first fluid outlet; a second fluid inlet; a check valve assembly; a second fluid outlet; a second channel connecting the second fluid inlet to the check valve assembly, and further connecting the check valve assembly to the second fluid outlet; and a fluid meter connected between the first fluid outlet and the second fluid inlet.

18 Claims, 4 Drawing Sheets

APPARATUS FOR METERING FLUIDS

BACKGROUND OF THE INVENTION

The present invention relates to an apparatus for metering fluids. More specifically, the present invention relates to a simple solid block, called a mono-block, which serves as a manifold and which includes an internal filter assembly, an internal check valve, channels within the block which provide fluid conduits, and inlet and outlet ports which provide a means for connecting the mono-block to the source of fluid to be measured, to the meter which measures the fluid volume, and to the output of the meter device. Optionally, additional channels may be placed in the mono-block to connect the input or the output side to accessories such as pressure detectors, pressure relief valves and the like.

U.S. Pat. No. 4,062,220 discloses a system for accurately mixing two or more liquids which employs a mixing manifold to receive the components of the mixture from three-way valves which are exterior to the manifold.

U.S. Pat. No. 4,062,472 discloses a system for accurately mixing two or more liquids which employs a mixing manifold to receive the components of the mixture from three-way valves which are exterior to the manifold.

U.S. Pat. No. 4,880,536 discloses a fluid filter assembly which includes a manifold, and a filter contained in a housing detachably mounted to the manifold.

U.S. Pat. No. 5,014,211 discloses a liquid chemical delivery system in which individual viscous chemicals are mixed with water in a manifold and delivered, in diluted form, to a number of destinations. The metering, the valves and pumps required for the operation are all external to the manifold.

U.S. Pat. No. 5,029,100 discloses a fuel-dispensing system including a manifold for receiving one or more grades of fuel at individual input ports and a plurality of output ports.

U.S. Pat. No. 5,118,008 discloses a fuel additive metering apparatus which includes a filter assembly, various valves, and a fluid meter. The parts are connected with pipes and fittings.

U.S. Pat. No. 5,246,026 discloses a device for automatic dilution of chemical additives and water utilizing a single pump which draws water and chemical additives through a dilution manifold. The additive control valves are exterior to the manifold.

U.S. Pat. No. 5,271,526 discloses a fuel additive metering apparatus of different configuration than that disclosed in U.S. Pat. No. 5,118,008. The assembly of the U.S. Pat. No. 5,271,526 also includes a filter assembly, various valves, and a fluid meter. The parts are connected with pipes and fittings.

British patent GB 2,086,535 discloses a valved manifold used in a flow metering or measuring apparatus. In this apparatus each flow line connector comprises a flow line valve.

A gasoline additive metering device is commercially available which utilizes a block manifold and a piston displacement meter. The piston displacement meter and the required spool valve are connected to the block manifold through multiple connections and channels.

SUMMARY OF THE INVENTION

An apparatus for metering fluids which comprises: a solid block having within the block a first fluid inlet; a filter assembly; a first fluid outlet; a first channel connecting the first fluid inlet to the filter assembly, and further connecting the filter assembly to the first fluid outlet; a second fluid inlet; a check valve assembly; a second fluid outlet; a second channel connecting the second fluid inlet to the check valve assembly, and further connecting the check valve assembly to the second fluid outlet; and a fluid meter connected between the first fluid outlet and the second fluid inlet.

DETAILED DESCRIPTION OF THE DRAWINGS

FIG. 1

Figure 1:
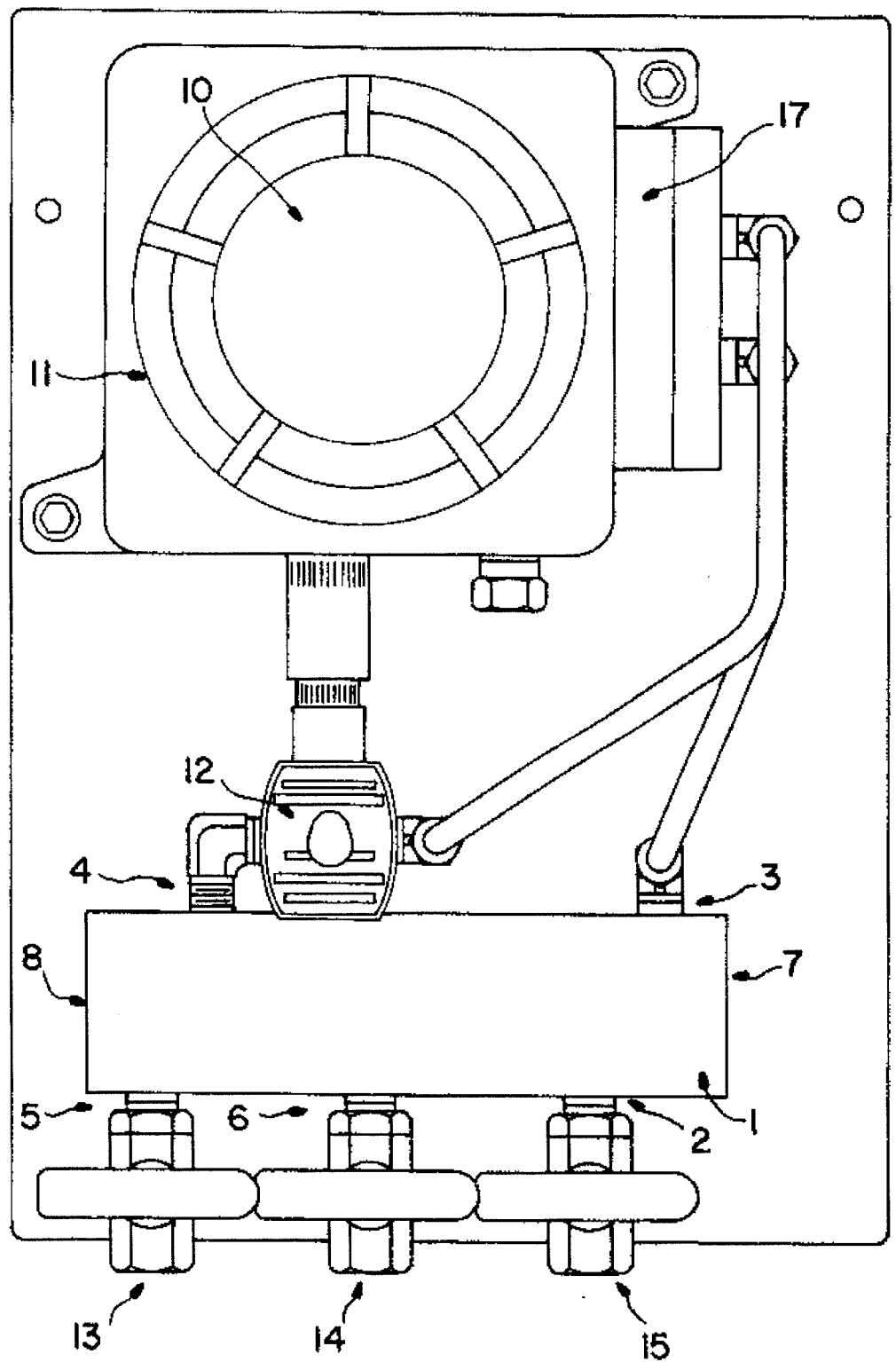
FIG. 1 is a drawing of the entire meter apparatus.

FIG. 1 illustrates one embodiment of the fluid metering apparatus. The fluid to be metered flows through an optional valve 15 which controls the fluid flow to the first fluid inlet port 2. The fluid flows into the mono-block 1, through the mono-block to the filter assembly 7, through the filter assembly 7 (shown in greater detail in FIG. 2) and then to the first fluid outlet port. From the first fluid outlet port the fluid flows to the fluid meter 17. The fluid flows through the fluid meter 17 and then from the meter through a valve 12 to the second fluid inlet port 4. The fluid flows through a check valve assembly 8 (shown in greater detail in FIG. 2), and then to the second fluid outlet port 5. An optional third outlet port 6 and optional valve 14 are also illustrated.

FIG. 2

Figure 2:
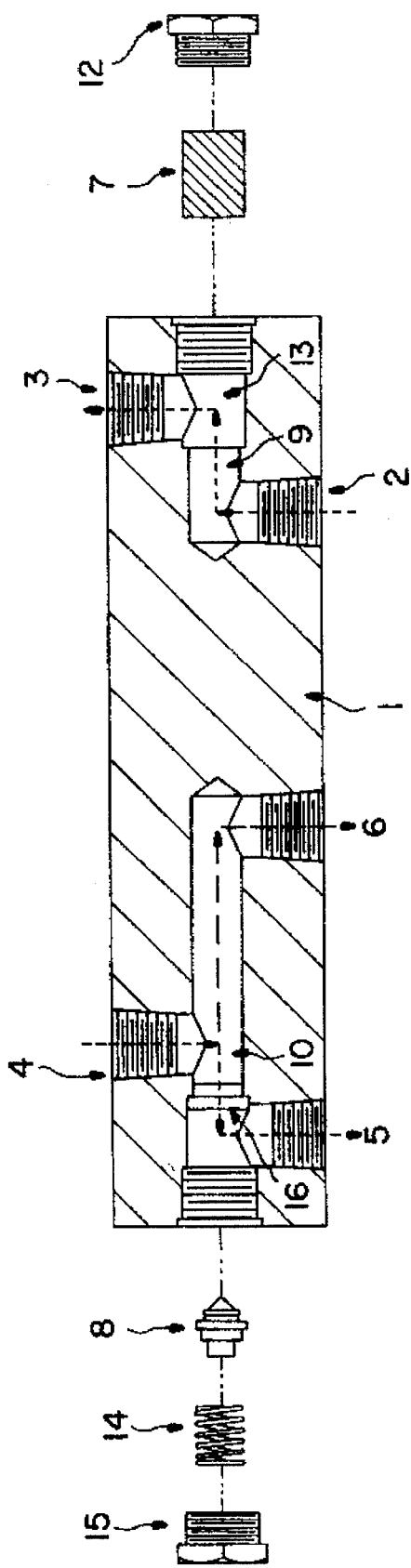
FIG. 2 is a detailed drawing of the mono-block.

FIG. 2 illustrates one embodiment of the mono-block. In this embodiment, the fluid to be measured enters the mono-block 1 at the first inlet port 2, passes through the first channel 9, and then flows through the filter assembly 7, 12 & 13. The filter assembly includes a filter element 7, a filter housing 13, and a retaining screw plug 12. The filter housing 13 is drilled out and is an integral part of the mono-block. From the filter assembly 7, 12 & 13, the fluid flows to the first outlet port 3. The fluid flows to the fluid meter which is not shown on FIG. 2. From the fluid meter the fluid returns to the second fluid inlet port 4. The fluid passes through the second channel 10 and through a check valve assembly 8, 14, 15 & 16. In this embodiment, the check valve assembly includes a plunger 8 which is forced against a valve seat 16 by a spring 14. The valve seat 16 is drilled out and is an integral part of the mono-block. The spring and plunger are retained in place by a retaining screw plug 15. From the check valve assembly 8, 10, 14, & 15, the fluid flows through the second channel 10 to the second outlet port 5. In this embodiment the second channel further extends to an optional third outlet port.

FIG. 3

Figure 3:
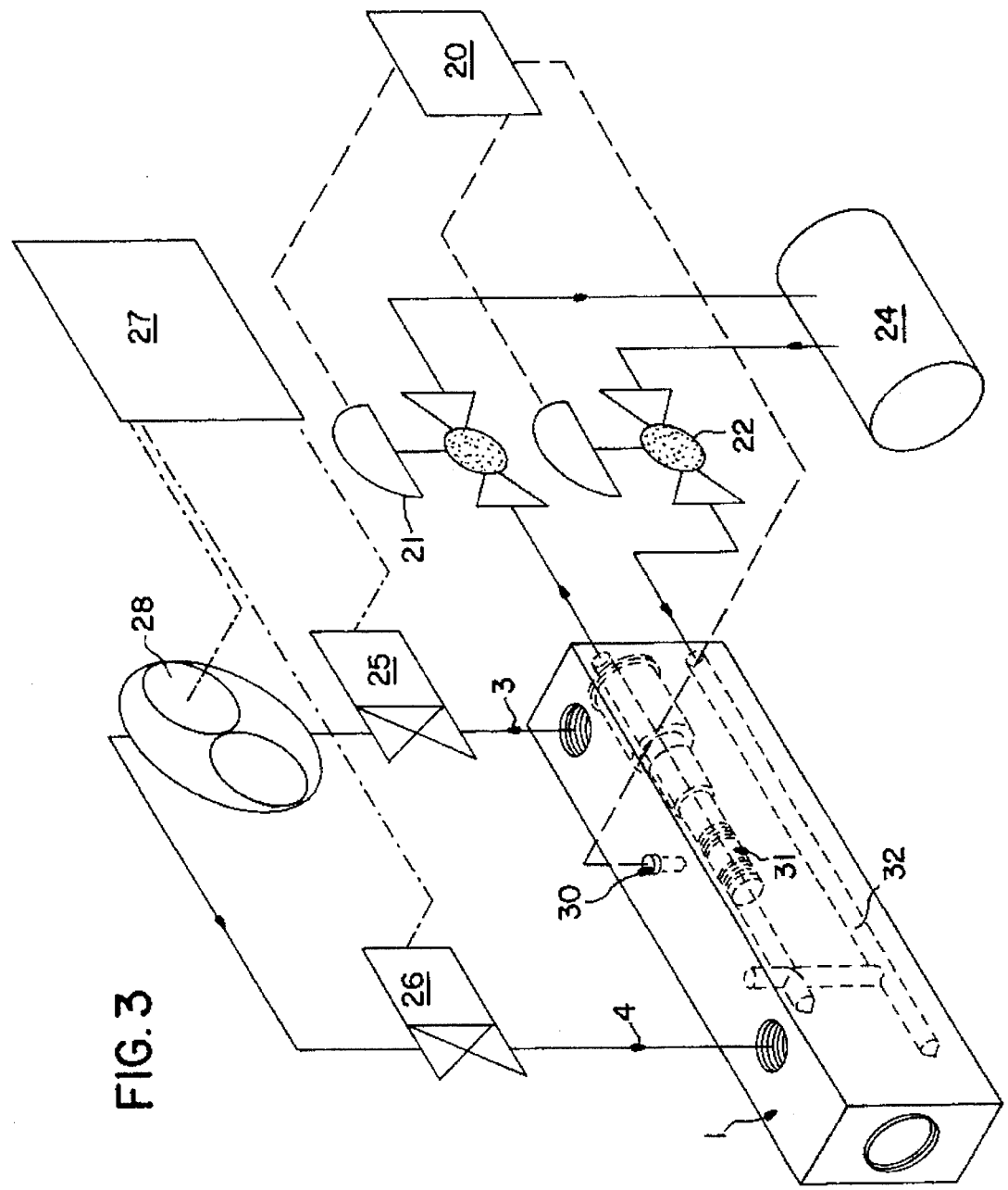

FIG. 3 illustrates one embodiment of the fluid-metering apparatus. A control valve 25 is connected to the first outlet port 3. Fluid flows through the control valve 25 to the meter through control valve 26 to second inlet port 4. Temperature control channels 32 are drilled in the mono-block 1. A cooling source 24 is connected to the channels through control valves 21 and 22. A temperature sensor 30 senses the temperature of the block and provides information to a temperature controller 20.

FIG. 4

Figure 4:
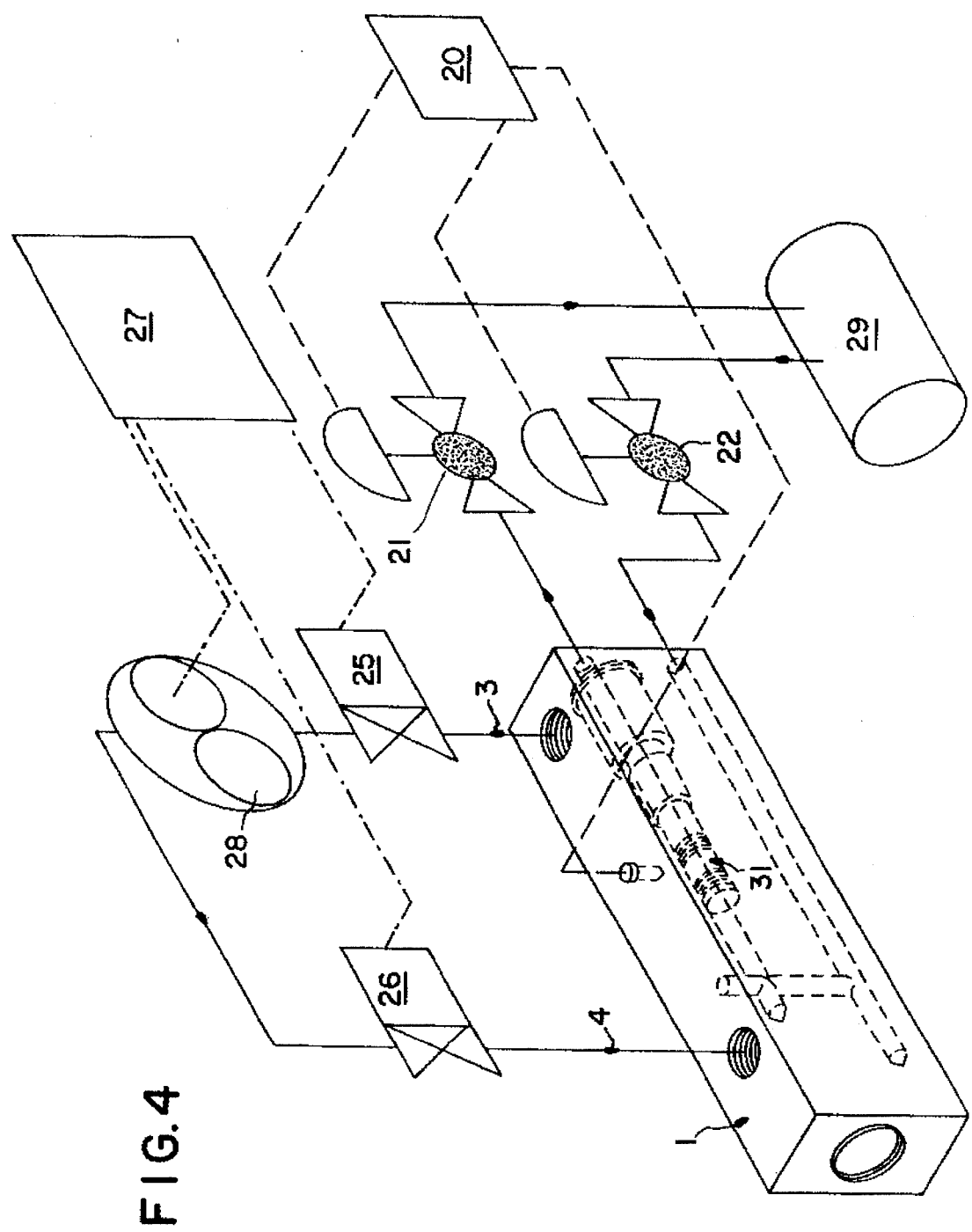

FIG. 4 illustrates one embodiment of the fluid-metering apparatus. A control valve 25 is connected to the first outlet port 3. Fluid flows through the control valve 25 to the meter through control valve 26 to second inlet port 4. Temperature control channels 32 are drilled in the mono-block 1. A heating source 29 is connected to the channels through control valves 21 and 22. A temperature sensor 30 senses the temperature of the block and provides information to a temperature controller 20.

DETAILED DESCRIPTION OF THE INVENTION

Pipe fittings are costly, and each one is a potential site for a leak. Furthermore, fittings have a small internal volume and they act to restrict flow and increase pressure loss in the apparatus. Accordingly, it is an object of the present invention to provide a fluid metering apparatus having a simple block manifold with an internal filter and check valve and also having only a single outlet for fluid going to the meter from the block manifold, and a single inlet for fluid returning to the block manifold from the meter. One major advantage of the mono-block design of the present invention is that it reduces the number of fittings required to connect the elements of the fluid metering assembly. A further advantage of the design of the present invention is that it allows for heating and cooling of the fluid stream which would be more difficult if the parts of the metering assembly were connected with conventional fittings. The invention also provides for lower pressure loss and increased flow.

MONO-BLOCK

The mono-block is a solid block of material into which the inlet ports, outlet ports, channels, filter housing and valve seat are all drilled or bored. The block may be made from a wide variety of materials depending upon the application. The primary requirement is that the material of the block be such as to tolerate the fluids to which it will be exposed, the pressures which it is expected to handle, and the environment in which it is expected to operate. For example, materials such as polytetrafluoroethylene (Teflon®), polyethylene, and other suitable plastics may be used in applications where the pressures to be encountered are not too high. While polytetrafluoroethylene (Teflon®) is inert to most organics and aqueous solutions, other plastic materials are inert to most aqueous solutions but may be vulnerable to various organic fluids. Metals such as aluminum, titanium, copper, iron, steels, alloy steels, stainless steels and similar alloys may be used as the material for the block. In order to enhance resistance to corrosion, the block may be plated with an inert metal such as gold or platinum. Stainless steel is a preferred material since it is readily available and serves in a wide variety of applications. The size of the mono-block is selected to match the size of the inlet and outlet ports and the channels which must be bored into the block. It may be readily appreciated that after the ports and channels are bored, sufficient metal must remain in the block so that structural integrity is preserved. Those skilled in the art will have no difficulty selecting a proper block size for any particular application.

FLUID INLET AND OUTLET PORTS

The fluid inlet and outlet ports are bored into the block and provide a means whereby the mono-block may be attached to the inlet pipes or the output pipes. These ports may have flanges, be welded, or be glued if the block is plastic, or have pipe threads. Pipe (NPT) threads are preferred. These ports may range from ⅛ inch to several inches in diameter, depending on the size piping required to conduct the fluid volumes which are to be measured. Other types of fittings may be used. For example, fittings in which a structure on the end of the inlet pipe is pressed against a fitting in the block may be employed. However, pipe threaded (NPT) ports are the most convenient since pipe threaded fittings, in convenient sizes are readily available. These fittings can be readily attached to the pipe threaded inlets and outlets.

The mono-block has four ports—a first inlet port, a first outlet port, a second inlet port, and a second outlet port. The first inlet port admits the fluid, whose volume is to be measured, to the first channel within the mono-block. After passing through the filter assembly, the fluid exits the mono-block through the first outlet port. The fluid meter is connected to this first outlet port. After the volume of the fluid has been measured by the meter, the fluid returns to the second inlet port of the mono-block. The fluid passes through the check valve assembly and out through the second outlet port. In addition to these required ports, the mono-block may optionally include other ports. For example, the channel which communicates with the second outlet port may be extended to a third outlet port. This optional configuration is shown in FIGS. 1 and 2. One use of such a third port is as a method of testing the meter. To do this testing, optional valves are attached to the second and third outlet ports. To perform the test, the valve attached to the second outlet port is closed and the valve attached to the third outlet port is opened. The fluid pump is activated, and a volume of fluid is allowed to flow through the meter and through the third outlet port where it is collected. The volume of the fluid may be measured by some well known method such as using a graduated cylinder, or weighing the fluid and dividing by the density of the fluid in cases where the density of the fluid is known. The delivered volume may be compared with the value given by the meter, and the result used to calibrate the meter. As will be set forth more fully below, other ports may be added to the mono-block to accommodate accessories.

THE CHANNELS

The channels are bored into the mono-block. The purpose of the channels is to provide conduits to conduct the fluid in and out of the mono-block, through the filter apparatus, and through the check valve. The channels are generally close in size to the internal diameter of the inlet and outlet pipes or fittings attached to the inlet and outlet ports. As will be set forth more fully below, the mono-block may optionally include channels which connect the main channels to various accessory devices such as pressure gauges. These channels should be of a size appropriate for the intended function.

THE FILTER ASSEMBLY

The filter assembly may be any filter assembly suitable for the liquid being measured. Any filter material suitable for filtering the desired fluid may be employed in the fluid meter assembly of the present invention. For example, metallic screens may be used. Steel and stainless steel screens have been found to be useful in this application. Organic or inorganic fibers have been formed into pads and sheets may be used. Asbestos and fiber glass filters are typical inorganic fibrous filters. Cellulosic fibers are useful organic filter materials. The cellulosic materials may be treated with various agents to change the surface properties. Polymers such as polyethylene and polypropylene may be formed into filters. Filters may be used in which the fibrous filter material is supported by a metallic screen which enhances the strength of the filter material. Optionally, two or more filter chambers may be provided. This arrangement would allow for filters of varying fineness to be used. The first filter would remove coarse materials, and subsequent filters would remove finer particles. The degree of filtering depends on the type of meter being used to measure the volume, and the application of the fluid being measured.

The filter housing or housings are bored into the mono-block, and are designed to accommodate whatever filter or filters have been selected for the particular application. The main requirement of the filter housing is that it provides a means by which the chosen filter may be sealed so that the fluid to be measured does not leak around the filter. FIG. 2 shows an example of such an arrangement. Fluid flows through the first channel 9 through a hole in the base of the filter housing 13. The fluid flows into the center of the filter 13 and out to the first outlet port. The top of the filter is sealed against the screw plug 12. Although the screw plug is generally a most convenient means of plugging the filter housing and providing a seal for the filter, other plugs could be used. Other methods of sealing filters within a housing will be readily apparent to those skilled in the art.

CHECK VALVE ASSEMBLY

The check valve assembly serves to prevent back flow from the outlet side of the fluid measuring apparatus to the inlet side. Any check valve which is actuated by fluid pressure may be used. In use, the check valve opens when the fluid whose volume is being measured and being pumped and closes when the pumping ceases and the pressure is removed. The particular type of check valve depends on the type of fluid being metered and the pressure being employed. A particularly convenient type of check valve is that illustrated in FIG. 2. In this assembly, a spring-loaded plunger is forced against a valve seat thereby sealing the valve. The pressure of the fluid being measured forces the plunger back and allows the fluid to pass by the check valve. The plunger may seat directly against the valve seat, or the plunger may have a sealing device such as an O-ring. Similarly, the valve seat may simply be formed by machining the metal of the mono-block into the proper shape. On the other hand, the valve seat may be placed into the block after it is bored. The valve seats may be made from a wide variety of materials including carbon steels, stainless steels, titanium, and polymeric organic materials such as Teflon® (polytetrafluoroethylene), and Ryton® (polyphenylene sulfide). The O-ring, if used, may be made from a variety of materials including various types of natural and synthetic rubbers such as viton, buna-n, perfluoroelastomers such as Chemraz®, Kalrez® and Teflon® (polytetrafluoroethylene), and other elastomers such as silicone rubber compositions.

FLUID METER

The fluid meter apparatus works with any closed channel fluid volume meter. For example, the apparatus may be used with differential pressure fluid volume meters such as orifice meters, venturi meters, flow nozzle meters, pitot meters, and elbow meters. The apparatus is usable with turbine meters wherein the flow of fluid is measured by the rate of rotation of a turbine in the fluid stream. The apparatus is usable with magnetic meters in which a conductive fluid flows through a magnetic field. The flow of the fluid causes a voltage to be induced in the fluid. The apparatus may be used with mass meters such as thermal meters and coriolis meters. Ultrasonic meters based upon sound transfer time may be used. For fluids of low viscosity flowing at high speeds, vortex shedding and fluidic meters may be used. The vortex shedding meter depends upon oscillation created by vortexes arising from an obstruction in the fluid stream. The fluidic type of meter depends upon the coanda effect in which a small side stream of the main moving stream enters one of two small ports and is fed back into the main stream. The arrangement of ports and feedback is such that the stream oscillates between the two ports. Target meters in which flow rate is determined by measuring the force generated by the flow of liquid striking a target may be used. Finally, the various type of positive displacement meters may be used. These meters generally depend upon moving elements to divide the stream into volume segments which are momentarily isolated and then returned to the stream. A particularly useful type of meter is the rotating gear meter. The gears may have several shapes including spur gears and elliptical gears and as they rotate in contact with each other, they trap fluid on one side and then release it on the other. The rate of rotation may be sensed by a number of means including sensing the rotation of one or more magnets within the gear. Since each turn delivers a segment of known size, the number of rotations correlates with the volume of fluid delivered.

OPTIONAL FEATURES

The metering apparatus may include optional features in addition to those disclosed above. One particularly useful option is to attach valves to the inlet and outlet ports. These valves may be used to control the flow of the fluid. In one particularly advantageous embodiment, the output of the fluid meter is transmitted to a control device which controls a control valve. This control valve may be operated by several means including electrically, pneumatically and hydraulically. Optionally, the control valve may be placed before or after the meter. This control device allows the metering apparatus to measure out controlled amounts of the fluid. If the control device is further connected to a suitable measuring device which measures the volume of a second fluid stream, the control device can adjust the amount of the first fluid stream to be a given proportion of the second fluid stream. By this means the measuring apparatus may be used to achieve proportional mixing of two fluid streams.

A pressure relief valve is a highly desirable optional feature. In some cases, the metering apparatus may be used intermittently. Between uses, there is the possibility the liquid remaining in the pipes may become warm. This possibility is most likely in situations where the metering apparatus must be located close to a warm reactor, or outdoors in a warm sunny location. In such case, the liquid may create pressures within the pipes which must be relieved in some manner. In order to accomplish this, a pressure relief valve may be placed inside the block. This valve is similar to a check valve in that it allows the liquid to escape when the pressure exceeds a certain limit, which limit is controlled by the design of the valve. A pressure relief valve may be created for any part of the apparatus by lengthening the appropriate channel and boring valve housing. The relief valve is then put into the block in the same way that the check valve is placed in the block. The materials suitable for the check valve are also suitable for the relief valve. To complete the relief valve assembly, a threaded output from the block is provided. The output from the pressure relief valve may be vented in any suitable manner, such as an overflow container which may be emptied from time to time. However, it is most desirable to have the relief valve vent back to the source tank for the fluid being metered. More than one pressure relief valve may be included. Relief valves may be provided before the meter, after the liquid returns from the meter, before the check valve, and after the check valve.

Other optional features are heaters or coolers placed within the mono-block. The heaters may be of various types, and may generally be placed within wells drilled in the block. If the heating or cooling is accomplished by having hot and cold fluids flow through the block, this flow can pass through channels drilled into the block. The use of heating and cooling of the block is particularly advantageous for meters which are sensitive to the temperature of the fluid, or to the viscosity changes which accompany such temperature changes. Temperature sensors may be incorporated into the block. The output of these sensors can then be transmitted to a temperature controller which may be used to control the temperature of the block by providing heating or cooling as necessary to maintain a desired temperature.

The temperature controller may be a relatively simple thermostatic device. In this method the control activates the heater when the temperature sensor senses that the temperature has fallen below the set point. Alternatively, if cooling is desired, the controller activates the cooler when the temperature exceeds the set point. Proportional controllers vary the amount of heating or cooling based upon the deviation of the temperature sensed from the set point. The closer the temperature is to the set point, the less correction is applied. Such controllers are less likely to suffer from overshoot than thermostatic controllers. Finally, more complex controllers based upon a mathematical analysis of the temperature as a function of time may be used. These methods, as well as other methods of temperature control, are well known to those skilled in the art.

A particularly useful embodiment of this invention is as a fuel additive measuring device. Such devices would commonly be used at a fuel-loading facility where fuel is pumped from a storage tank into the tank truck which hauls the gasoline to a gasoline station. As the gasoline is being pumped into the truck, the proper amount of additive is added to the gasoline. In this embodiment a rotating gear positive displacement meter is often used. The controller receives volume data from a measurement device in the gasoline and additive streams. From time to time, as the gasoline stream flows, the controller calculates the amount of additive required for the gasoline which has been dispensed since the last additive was added and controls the pumps and valves which allow the dispensation of further additive. The user of the device selects the ratio of additive to gasoline, and the controller uses this ratio in calculating the amounts of additive to be dispensed. The flow of gasoline and additive are controlled by the controller through electronically actuated pumps and valves. Such controllers and the necessary pumps and valves are well known in the art.

We claim:

1. An apparatus for metering fluids which comprises: a solid block having within the block a first fluid inlet; a filter assembly; a first fluid outlet; a first channel connecting the first fluid inlet to the filter assembly, and further connecting the filter assembly to the first fluid outlet; a second fluid inlet; a check valve assembly; a second fluid outlet; a second channel connecting the second fluid inlet to the check valve assembly, and further connecting the check valve assembly to the second fluid outlet; and a fluid meter connected between the first fluid outlet and the second fluid inlet.

2. An apparatus according to claim 1 further comprising a channel connecting the check valve assembly to a third fluid outlet.

3. An apparatus according to claim 1 further comprising a channel connecting the inlet of the check valve assembly to a third fluid outlet.

4. An apparatus according to claim 3 further comprising a valve external to the block whereby fluid output from the second fluid outlet or the third fluid outlet may be controlled.

5. An apparatus according to claim 1 further comprising a heater in the block.

6. An apparatus according to claim 5 further comprising a temperature sensor and a controller.

7. An apparatus according to claim 1 further comprising a cooler in the block.

8. An apparatus according to claim 7 further comprising a temperature sensor and a temperature controller.

9. An apparatus according to claim 1 further comprising a heater and a cooler in the block.

10. An apparatus according to claim 9 further comprising a temperature sensor and a temperature controller.

11. An apparatus according to claim 1 wherein the filter assembly comprises a stainless steel screen.

12. An apparatus according to claim 1 wherein the fluid meter comprises a positive displacement meter.

13. An apparatus according to claim 1 wherein the fluid meter comprises a turbine flowmeter.

14. An apparatus according to claim 1 wherein the block is a solid block of stainless steel.

15. An apparatus according to claim 1 wherein the block is a solid block of stainless steel, and the fluid meter comprises a positive displacement meter.

16. An apparatus according to claim 1 further comprising one or more pressure relief valves.

17. An apparatus according to claim 1 wherein a control valve is placed before the meter.

18. An apparatus according to claim 1 wherein a control valve is placed after the meter.

* * * * *